(12) United States Patent
Ito et al.

(10) Patent No.: US 7,709,553 B2
(45) Date of Patent: May 4, 2010

(54) PHOTO CATION POLYMERIZABLE RESIN COMPOSITION AND SURFACE PROTECTIVE MATERIAL FOR OPTICAL DISK

(75) Inventors: Yuichi Ito, Sodegaura (JP); Satoru Suda, Sodegaura (JP); Yasushi Mizuta, Sodegaura (JP); Katsunori Nishiura, Sodegaura (JP); Toshikazu Gomi, Sodegaura (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 916 days.

(21) Appl. No.: 10/555,176

(22) PCT Filed: Apr. 16, 2004

(86) PCT No.: PCT/JP2004/005461

§ 371 (c)(1),
(2), (4) Date: Nov. 1, 2005

(87) PCT Pub. No.: WO2004/099286

PCT Pub. Date: Nov. 18, 2004

(65) Prior Publication Data

US 2007/0037896 A1 Feb. 15, 2007

(30) Foreign Application Priority Data

May 7, 2003 (JP) ................. 2003-129421

(51) Int. Cl.
 *C08F 2/46* (2006.01)
 *C08F 2/50* (2006.01)
 *C08J 3/28* (2006.01)
 *B32B 27/38* (2006.01)

(52) U.S. Cl. .................. 522/168; 522/170; 522/15; 522/25; 522/31; 522/162; 522/178; 522/181; 549/519; 428/411.1; 428/413; 428/414; 428/355 R; 428/355 EP; 427/162

(58) Field of Classification Search ............... 522/15, 522/25, 31, 168, 170; 549/518; 428/411.1, 428/355 EP, 355 R, 413, 414
See application file for complete search history.

(56) References Cited

U.S. PATENT DOCUMENTS

| | | | |
|---|---|---|---|
| 6,852,767 B2 | 2/2005 | Maeda | |
| 6,866,376 B2 | 3/2005 | Maeda et al. | |
| 2002/0068772 A1* | 6/2002 | Laksin et al. | ............... 523/160 |
| 2002/0188033 A1 | 12/2002 | Maeda | |
| 2003/0094738 A1 | 5/2003 | Maeda et al. | |
| 2003/0112307 A1* | 6/2003 | Maeda et al. | ............... 347/102 |
| 2003/0158286 A1 | 8/2003 | Nishizaki et al. | |
| 2003/0218269 A1 | 11/2003 | Maeda et al. | |
| 2004/0167315 A1* | 8/2004 | Sasa | ............... 528/406 |

FOREIGN PATENT DOCUMENTS

| | | | |
|---|---|---|---|
| JP | 05-125150 A | 5/1993 | |
| JP | 09328635 A | * 12/1997 | |
| JP | 10-168341 A | 6/1998 | |
| JP | 11-001631 A | 1/1999 | |
| JP | 2000-109511 A | 4/2000 | |
| JP | 2001-261780 A | 9/2001 | |
| JP | 2001-316450 A | 11/2001 | |
| JP | 2002-003575 A | 1/2002 | |
| JP | 2002-069269 A | 3/2002 | |
| JP | 2002-348478 A | 12/2002 | |
| JP | 2003-073481 A | 3/2003 | |
| JP | 2003-105077 A | 4/2003 | |
| JP | 2003-212965 A | 7/2003 | |
| JP | 2003-313274 A | 11/2003 | |
| WO | WO 02/06371 A2 | 1/2002 | |

OTHER PUBLICATIONS

English machine translation of JP 09-328635 A.*
Product Data Sheet, Epikot Resin 1004, Sep. 2002.*
Decre et al., "Cover Layer Technology for the High-Numerical-Aperture Digital Video Recording System," *Jpn. J. Appl. Phys.*, Feb. 2000, pp. 775-778, vol. 39, Part 1, No. 2B, Publication Board, Japanese Journal of Applied Physics.
"Photocationic Setting Oxetane Resin," *Fine Chemical*, 2000, pp. 8-10, vol. 29, No. 19 and English translation.
English Language Abstract of Japanese Patent Publication No. 05-125150.
English Language Abstract of Japanese Patent Publication No. 11-001631.
English Language Abstract of Japanese Patent Publication No. 11-061078.
English Language Abstract of Japanese Patent Publication No. 59-147016.
English Language Abstract of Japanese Patent Publication No. 57-187314.
English Language Abstract of Japanese Patent Publication No. 09-328635.
English Language Abstract of Japanese Patent Publication No. 2003-327951.
English Language Abstract of Japanese Patent Publication No. 2004-075929.

* cited by examiner

*Primary Examiner*—Sanza L McClendon
(74) *Attorney, Agent, or Firm*—Buchanan Ingersoll & Rooney PC

(57) ABSTRACT

The invention provides a cation polymerizable resin composition excellent in curing properties and corrosion resistance with less resin coloration and less cure shrinkage, which is a material suitable as a surface protective material for optical disk. Specifically, the cation polymerizable resin composition comprises an epoxy compound (A) as an essential ingredient represented by formula 1 wherein $R_1$ and $R_2$ each represent a saturated or unsaturated carbon atom, and $R_3$ represents a hydrogen atom or a saturated or unsaturated carbon atom, a cation polymerizable compound (B) other than the epoxy compound represented by formula 1, a photo cation polymerization initiator (C) and a photo radical polymerization initiator (D).

19 Claims, 1 Drawing Sheet

PHOTO CATION POLYMERIZABLE RESIN COMPOSITION AND SURFACE PROTECTIVE MATERIAL FOR OPTICAL DISK

TECHNICAL FIELD

The present invention relates to a cation polymerizable resin composition excellent in curing during polymerization, which is used as an adhesive for optical disk requiring dimensional accuracy, a coating material, and an adhesive for protective sheet.

BACKGROUND ART

Epoxy resin is superior in heat resistance, adhesiveness, water resistance, mechanical strength and electrical properties, and is used in semiconductor sealing resin, laminate resin, coating material, adhesive, ink and various sealing materials. A method of curing the epoxy resin includes a method of using a curing agent such as an acid anhydride, amine compound, isocyanate compound and phenolic compound and polymerization reaction (addition reaction) of epoxy resin itself, that is, a photo/thermosetting system by cation polymerization.

As the curing system using cation polymerization, the cation polymerization which involves using not only the epoxy resin but also oxetane resin, vinyl ethers and styrene or derivatives thereof is known, and particularly the cation polymerization using epoxy resin and oxetane resin is extensively examined.

Among optical recording media, DVD (digital video disk or digital versatile disk) capable of recording large-capacity information attracts attention in recent years, and techniques wherein the memory capacity of one side of an optical disk is increased to 20 to 30 G bytes by utilizing a blue-violet laser light source at a wavelength of 405 nm and reducing a protective layer covering the recording layer to 0.1 to 0.3 mm are proposed (Japanese Journal Applied Physics, Vol. 30 (2000)). This DVD, unlike a conventional structure wherein two disks are attached, is composed fundamentally of one disk, and thus requires a surface protective layer. With respect to a material of this protective layer, Japanese Journal Applied Physics, Vol. 39, 775-778 (2000) shows (i) a method that involves spin-coating a photo cation polymerizable resin composition onto an optical disk and then irradiating it with UV rays in a nitrogen atmosphere to form a protective layer and (ii) a method that involves spin-coating a photo cation polymerizable resin composition onto a polycarbonate sheet, attaching it to an optical disk and irradiating it with UV rays to form a protective layer.

The performance required by these protecting coatings is that for recording with a blue-violet laser at 405 nm as a light source, the protective coating has excellent light transmittance at 405 nm and specifically requires 90% light transmittance. It is also desired that after spin coating or attachment of a polycarbonate sheet, the base polycarbonate plate is not deformed by curing upon irradiation with UV rays, and it is thus desired that the cure shrinkage of the surface protective material for optical disk is low. From this viewpoint, photo cation polymerization is preferably used in ring-opening polymerization. Further, there is a high degree of freedom in design of hardness by regulation of crosslinking density.

However, the cation polymerization system is poor in polymerizability as compared with the previously mentioned acid anhydrides and amines. Accordingly, this polymerizability is extensively studied. Examples of proposed methods include a method of increasing polymerizability by using oxetane resin in combination with epoxy resin according to Fine Chemical, Vol. 29, No. 19, 5, 2000, a method of using hydrogenated epoxy resin described in JP-A 2001-261780, a method of using cyclohexene oxide described in JP-A 2001-316450, and a system wherein vinyl ether is combined with a weak base as proposed in JP-A2000-109511. There is also an easier method which comprises adding a large amount of a catalyst for cation polymerization.

In the method of using oxetane resin, the rate of polymerization can be increased, but the initiation reaction itself should be coped by increasing the amount of a catalyst added, by simultaneously using epoxy resin, or by using higher energy, and there are problems such as deterioration of water resistance and coloration of resin caused by ionic components derived from the catalyst. In the method of using the hydrogenated epoxy resin having hydroxyl groups, there is a limit to use of epoxy resin having other skeletons used to exhibit functions. The method of using cyclohexene oxide has the problem of significant cure shrinkage. In the system where in vinyl ether is combined with a weak base, the weak base not forming a chemical bond with resin is added after curing, and thus there is the problem of inferior water resistance. It is found that when the amount of the catalyst for cation polymerization is increased, water resistance and corrosion resistance are significantly deteriorated.

DISCLOSURE OF INVENTION

The object of the present invention is to provide a cation polymerizable resin composition excellent in curing properties and corrosion resistance with less resin coloration and less cure shrinkage to solve the problems described above, as well as a material suitable as an optical disk-protecting material.

As a result of extensive study to solve the problems described above, the present inventors attracted their attention on the formation of oxonium ion by a cation ring-opening polymerizable compound in initiation reaction and on the stability of the oxonium ion. They attracted their attention on activation energy as a measure of the stability until formation of a ring-opened product upon adding methyl cation to cyclic ether compounds. Specifically, they conducted comparison and examination based on primary principle calculation, and as a result they found that the conventional photo cation polymerization can be activated by energy under specific activation energy. Particularly, they found that an epoxy compound represented by formula 1 can initiate the reaction easily with the lowest activation energy.

Further, the present inventors paid attention to the fact that the polymerization initiation step of photo cation polymerization is mediated by radicals, and examined various radial initiators, and as a result, they found that a specific photo radical polymerization initiator can be simultaneously used in further activating the reaction, and has a higher polymerization ability than in the system using oxetane or a derivative thereof which has been considered excellent in polymerizability, to exhibit curing properties comparative to those in the radical polymerization system. Further, the inventors found that a cation polymerizable resin having a specific molecular-weight range can be blended to give a surface protective material for optical disk requiring high dimensional accuracy, and the inventors thereby achieved the object and arrived at the present invention.

That is, the present invention relates to:

(1) A photo cation polymerizable resin composition comprising (A) a cation ring-opening polymerizable compound whose activation energy in ring-opening reaction at the time of addition of methyl cation is not higher than 15 kcal/mol, (B) a cation polymerizable compound, and (C) a photo cation polymerization initiator.

(2) The photo cation polymerizable resin composition, wherein the cation ring-opening polymerizable compound (A) is a compound having at least one oxirane cyclic group represented by formula 1 in one molecule chain, and the cation polymerizable compound (B) is a cation polymerizable compound not containing a structure represented by formula 1:

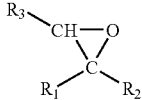

[Formula 1]

wherein $R_1$ and $R_2$ each represent a saturated or unsaturated carbon atom, and $R_3$ represents a hydrogen atom or a saturated or unsaturated carbon atom.

(3) The photo cation polymerizable resin composition, wherein the cation ring-opening polymerizable compound (A) is 0.1 to 10.0 parts by weight and the cation polymerizable compound (B) is 90.0 to 99.9 parts by weight based on 100 parts by weight of (A) and (B) in total in the photo cation polymerizable resin composition.

(4) The photo cation polymerizable resin composition, wherein the amount of the photo cation polymerization initiator (C) added is in the range of 0.1 to 10.0 parts by weight based on 100 parts by weight of the cation ring-opening polymerizable compound (A) and the cation polymerizable compound (B) in total in the photo cation polymerizable resin composition.

(5) The photo cation polymerizable resin composition, wherein the photo radical polymerization initiator (D) is contained in the range of 10.0 parts by weight or less based on 100 parts by weight of the cation ring-opening polymerizable compound (A) and the cation polymerizable compound (B) in total in the photo cation polymerizable resin composition.

(6) The photo cation polymerizable resin composition, wherein a cation polymerizable functional group of the cation polymerizable compound (B) is an epoxy group and/or an oxetane group, and an epoxy group and/or an oxetane group may be contained in the cation ring-opening polymerizable compound (A).

(7) The photo cation polymerizable resin composition, wherein the ratio of the total of the number of moles of epoxy groups contained in the cation ring-opening polymerizable compound (A) and the cation polymerizable compound (B) and the number of moles of oxirane cyclic groups represented by formula 1 to the number of moles of oxetane groups is 0.05 to 20.0.

(8) The photo cation polymerizable resin composition, wherein the photo cation polymerization initiator (C) is an iodonium salt-based initiator.

(9) The photo cation polymerizable resin composition, wherein the photo radical polymerization initiator (D) is an acetophenone-based compound.

(10) A coating material composition and an adhesive composition comprising the photo cation polymerizable resin composition described above.

(11) The photo cation polymerizable resin composition, wherein the cation polymerizable compound (B) in the photo cation polymerizable resin composition comprises a cation polymerizable compound (B-1) whose functional group equivalent is 700 or more and a cation polymerizable compound (B-2) whose functional group equivalent is less than 700.

(12) The photo cation polymerizable resin composition, wherein the compound (B-1) is 5.0 to 40.0 parts by weight and the compound (B-2) is 50.0 to 94.9 parts by weight in the cation polymerizable compound (B), based on 100 parts by weight of the cation ring-opening polymerizable compound (A) and the cation polymerizable compound (B) in total in the photo cation polymerizable resin composition.

(13) A coating material and/or an adhesive using the photo cation polymerizable resin composition described above, and/or a material for optical disk and a surface protective material for optical disk comprising a protective sheet having the adhesive applied thereon.

The cation polymerizable composition of the present invention is a cation polymerizable resin composition excellent in curing properties and corrosion resistance with less resin coloration and less cure shrinkage, to provide a material suitable as an optical disk-protecting material.

BEST MODE FOR CARRYING OUT THE INVENTION

Figure 1:
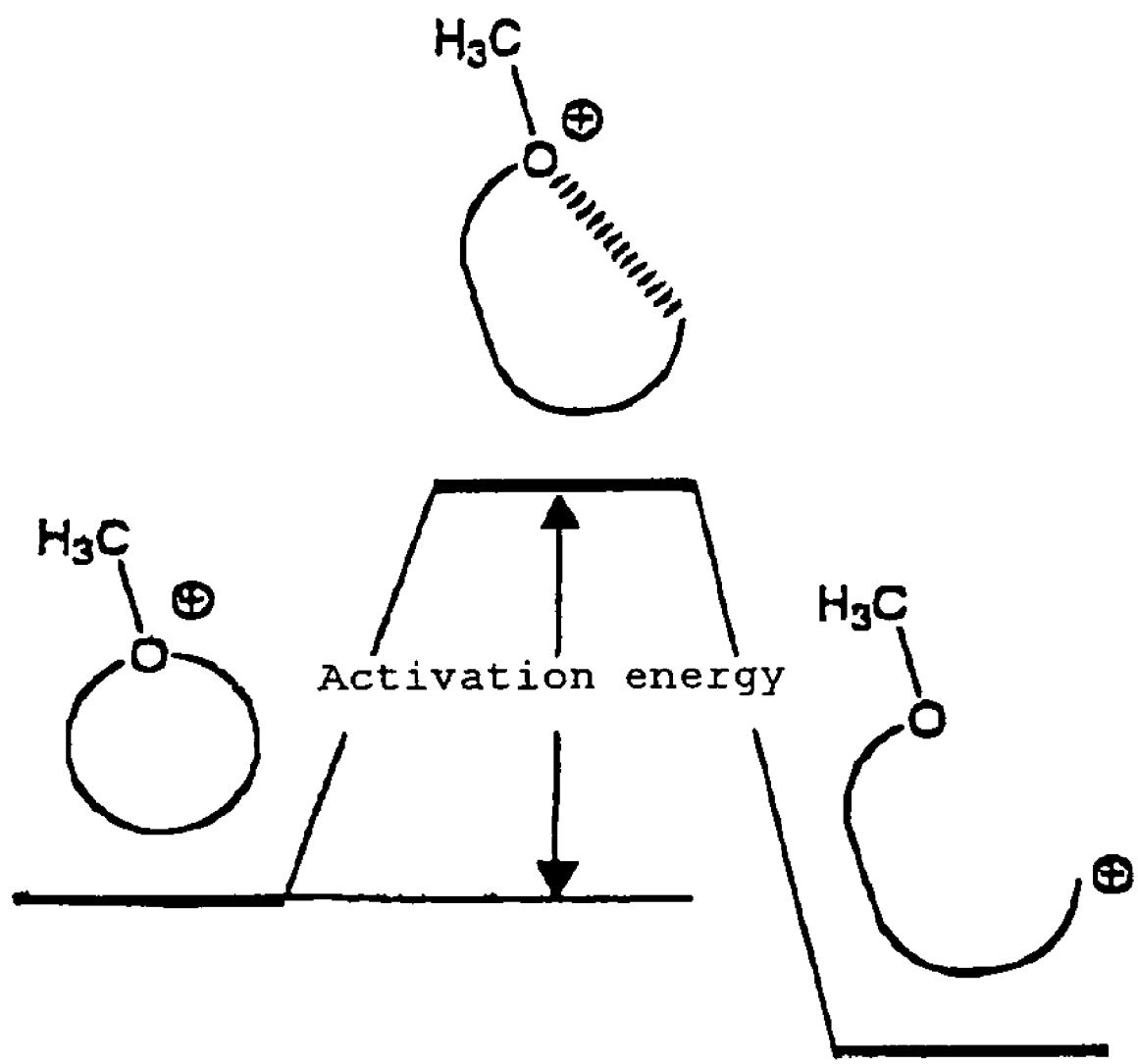
FIG. 1 shows a conceptual drawing of activation energy.

Hereinafter, the present invention is described in more detail.

The compound (A) in the present invention is a group of compounds whose ring-opening polymerizability in polymerization of cation ring-opening polymerizable compound was compared and examined by using a model of the reaction of addition of methyl cation to a cyclic compound. Specifically, the activation energy in the reaction route shown in FIG. 1 was calculated by using primary principle calculation, and the results are shown in Table 1. The results indicated that there is a cyclic ether structure having lower activation energy than those of conventionally frequently used epoxy compounds, oxetane compounds and alicyclic epoxy compounds, and the activation energy is preferably 15 kcal/mol, and particularly the structure is preferably an epoxy compound having a structure represented by formula 1:

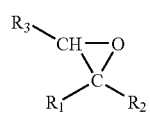

[Formula 1]

wherein $R_1$ and $R_2$ each represent a saturated or unsaturated carbon atom, and $R_3$ represents a hydrogen atom or a saturated or unsaturated carbon atom.

This structure is instable in the form of an oxonium ion formed upon initiation of cation ring-opening polymerization, and easily rearranged into a highly active carbonium ion so that polymerization immediately proceeds. On the other hand, cyclic ethers having other structures have higher activation energy, and thus they advantageously occur in the form of an oxonium ion without undergoing ring opening, thus lowering polymerizability.

The epoxy compound represented by formula 1 is an epoxy compound wherein among carbon atoms constituting an oxirane ring, one carbon atom is substituted with at least one hydrogen atom, and one of the other carbon atoms is substituted with two carbon atoms, the carbon atoms in the substituents have a saturated bond or an unsaturated bond. The saturated or unsaturated bond of the carbon atom may be substituted with an arbitrary atomic group.

Specifically, $R_1$ and $R_2$ each represent a hydrocarbon consisting of alkane, alkene or alkyne and may have a substituent group. The substituent group includes, but is not limited to, an alkyl group, cycloalkyl group, aromatic ring, halogen, hydroxyl group, ether, aldehyde, ketone, ester group, alkyl-substituted amide group, and alkyl-substituted amino group. $R_3$ represents a hydrogen atom or a hydrocarbon consisting of alkane, alkene or alkyne, and may have a substituent group. The substituent group includes, but is not limited to, an alkyl group, cycloalkyl group, aromatic ring, halogen, hydroxyl group, ether, aldehyde, ketone, ester group, alkyl-substituted amide group, and alkyl-substituted amino group.

Examples of the epoxy compounds represented by formula 1 include terpinolene dioxide, isobutylene oxide, isoprene oxide, β-pinene oxide, 2-methyl glycidol, limonene dioxide, methyl 2-methylglycidate, 7-oxa-bicyclo[4.1.0]heptane oxiranyl, 2-acetyl-2-methyloxirane, 2-(benzyloxymethyl)-2-methyloxirane, 5,6-epoxy-4,7-methano-1-oxaspiro-(2,5)-octane, 2-methyl-1-(2-methyl-oxiranyl)-non-3-en-1-ol, myrcene dioxide etc. Like terpinolene diepoxide, limonene dioxide, 7-oxa-bicyclo[4.1.0]heptaneoxiranyl 5,6-epoxy-4,7-methano-1-oxaspiro-(2,5)-octane and myrcene dioxide in particular, the epoxy compounds may have another cation polymerizable skeleton such as oxirane ring in the same molecule insofar as they have at least one oxirane ring structure in one molecule.

A phenolic epoxy compound having the structure of formula 1 obtained in a usual manner from a compound having 2-chloromethyl-2-methyloxirane and a phenolic hydroxyl group is also subjected to the present invention. A product obtained by converting 2-chloromethyl-2-methyloxirane and an alcoholic hydroxyl group with metal sodium or the like into an alcoholate or a product converted into ether by desalting reaction can also be subjected to the present invention. Similarly, a modified product of 2-methyl glycidol with an isocyanate compound, acrylic resin containing a methylglycidyl group-containing methacrylate monomer (MGMA manufactured by Daicel Chemical Industries, Ltd.), and an epoxy compound having the structure of formula 1 are also subjected to the present invention.

As the compound (B) used in the present invention, a cation polymerizable compound not containing the structure represented by formula 1 is used. Specific examples include compounds having a cyclic ether in the molecule, such as an oxirane ring, oxetane ring or tetrahydrofuran ring, and cation polymerizable compounds such as vinyl ethers and styrene or derivatives thereof, and the compound (B) is not particularly limited insofar as it has cation polymerizability, but is practically desirably a compound having an oxirane ring, that is, epoxy resin, and a compound having an oxetane ring, that is, oxetane resin.

Then, the compound (B) is illustrated. The compound having one oxirane ring includes, for example, phenyl glycidyl ether, butyl glycidyl ether etc., and the compound having two or more oxirane rings includes, for example, trimethylol propane triglycidyl ether, bisphenol A diglycidyl ether, bisphenol F diglycidyl ether, novolak diglycidyl ether, polypropylene diglycidyl ether, and glycidyl ethers such as diglycidyl ether having terminals modified with polybutadiene or polysulfide.

Alicyclic epoxy compounds such as 3,4-epoxycyclohexylmethyl-3,4-epoxycyclohexane carboxylate and bis-(3,4-epoxycyclohexyl) adipate can also be mentioned.

Examples of the compound having one oxetane ring include 3-ethyl-3-hydroxymethyl oxetane, 3-(meth)allyloxymethyl-3-ethyl oxetane, (3-ethyl-3-oxetanylmethoxy) methyl benzene, 2-ethylhexyl(3-ethyl-3-oxetanylmethyl) ether, ethyldiethylene glycol(3-ethyl-3-oxetanylmethyl) ether, 3-cyclohexylmethyl-3-ethyl-oxetane etc.

Examples of the compound having two oxetane rings include 1,4-bis{[(3-ethyl-3-oxetanyl)methoxy] methyl}benzene, bis{[(1-ethyl) 3-oxetanyl]methyl}ether, 1,4-bis[(3-ethyl-3-oxetanyl)methoxy]benzene, 1,3-bis[(3-ethyl-3-oxetanyl)methoxy]benzene, 3,7-bis(3-oxetanyl)-5-oxa-nonane, 1,4-bis[(3-ethyl-3-oxetanylmethoxy)methyl] benzene, 1,2-bis[(3-ethyl-3-oxetanylmethoxy)methyl] ethane, 1,2-bis[(3-ethyl-3-oxetanylmethoxy)methyl] propane, ethylene glycol-bis(3-ethyl-3-oxetanylmethyl) ether, dicyclopentenyl-bis(3-ethyl-3-oxetanylmethyl)ether, etc.

Examples of the compound having three or more oxetane rings include trimethylol propane tris(3-ethyl-3-oxetanylmethyl) ether, pentaerythritol tris (3-ethyl-3-oxetanylmethyl) ether, pentaerythritol tetrakis(3-ethyl-3-oxetanylmethyl) ether, dipentaerythritol pentakis(3-ethyl-3-oxetanylmethyl) ether etc.

These cation polymerizable compounds may be used alone or as a mixture of two or more thereof.

Based on 100.0 parts in total by weight of the epoxy compound (A) represented by formula 1 and the cation polymerizable compound (B) other than the epoxy compound represented by formula 1, the epoxy compound (A) represented by formula 1 is usually 0.1 to 30.0 parts by weight, and the cation polymerizable compound (B) other than the epoxy compound represented by formula 1 is usually 70.0 to 99.9 parts by weight, and preferably the compound (A) is 0.5 to 10.0 parts by weight and the compound (B) is 90.0 to 99.9 parts by weight. When the amounts of (A) and (B) are in the above range, curing properties are sufficiently exhibited, and the resin is not colored due to generation of heat at the time of curing.

The ratio of the total of the number of moles of epoxy groups contained in the compounds (A) and (B) and the number of moles of oxirane ring groups represented by formula 1 to the number of moles of oxetane groups, that is, the epoxy group mol number/oxetane group mol number is 0.05 to 20.0, more preferably 0.1 to 10.0.

In the photo cation polymerizable resin composition of the present invention, the photo cation polymerization initiator (C) and the photo radical polymerization initiator (D) are activated by active energy rays to initiate polymerization. This active energy rays include, but are not limited to, microwaves, IR rays, visible rays, UV rays, X rays, γ rays and electron beams, among which easily usable UV rays are preferably used. The light source for UV rays is not particularly limited, but preferably a mercury lamp and a metal halide lamp are used.

The photo cation polymerization initiator (C) used in the present invention is a compound generating cation species or Lewis acid by active energy rays (visible rays, UV rays, electron beams etc.) and is preferably an onium salt compound, more preferably an iodonium salt.

The onium salt compound which generates cation species or Lewis acid by activation energy rays includes diphenyl iodonium, 4-methoxy diphenyl iodonium, bis(4-methylphenyl)iodonium, bis(4-tert-butylphenyl)iodonium, bis(dodecylphenyl)iodonium, triphenyl sulfonium, diphenyl-4- thiophenoxy phenyl sulfonium, bis[4-(diphenylsulfonio)-phenyl]sulfide, bis[4-(di(4-(2-hydroxyethyl)phenyl)sulfonio)-phenyl]sulfide, and a compound consisting of a combination of an onium ion such as η5-2,4-(cyclopentadienyl) [1,2,3,4,5,6-η-(methylethyl)benzene]-iron (1+) and an anion such as tetrafluoroborate, hexafluorophosphate, hexafluoroantimonate, hexafluoroarsenate or hexachloroantimonate.

A commercial onium salt which generates cation species or Lewis acid by active energy rays includes Uvacure 1590, 1591 (trade name, manufactured by Daicel UCB), Sunaid SI-110, SI-180, SI-100L, SI-80L, SI-60L (trade name, manufactured by Sanshin Kagaku Kogyo), Adecaoptomer SP-100, SP-172, SP-170, SP-152 (trade name, manufactured by Asahi Denka), 2074 (trade name, manufactured by Rhodia) etc.

A compound which generates cation species and Lewis acid by heat can also be simultaneously used. Specific examples include triphenyl sulfonium boron tetrafluoride, triphenyl sulfonium antimony hexafluoride, triphenyl sulfonium arsenic hexafluoride, tri(4-methoxyphenyl)sulfonium arsenic hexafluoride, diphenyl(4-phenylthiophenyl)sulfonium arsenic hexafluoride, p-t-butyl benzyl tetrahydrothiophenium antimony hexafluoride, N,N-dimethyl-N-benzylanilinium antimony hexafluoride, N,N-dimethyl-N-benzylanilinium boron tetrafluoride, N,N-dimethyl-N-(4-chlorobenzyl)anilinium antimony hexafluoride, N,N-dimethyl-N-(1-phenylethyl)anilinium antimony hexafluoride, N-benzyl-4-dimethylaminopyridinium antimony hexafluoride, N-benzyl-4-diethylaminopyridinium trifluoromethanesulfonic acid, N-(4-methoxybenzyl)-4-dimethylaminopyridinium antimony hexafluoride, N-(4-methoxybenzyl)-4-diethylaminopyridinium antimony hexafluoride, N,N-dimethyl-N-(4-methoxybenzyl)toluidinium antimony hexafluoride, N,N-diethyl-N-(4-methoxybenzyl)toluidinium antimony hexafluoride, ethyltriphenylphosphonium antimony hexafluoride, tetrabutylphosphonium antimony hexafluoride, diphenyliodonium arsenic hexafluoride, di-4-chlorophenyliodonium arsenic hexafluoride, di-4-bromophenyliodonium arsenic hexafluoride, di-p-tolyliodonium arsenic hexafluoride, phenyl(4-methoxyphenyl)iodonium arsenic hexafluoride etc. A commercial thermal potential cation polymerization initiator includes, for example, Sunaid SI-60L, Sunaid SI-80L, Sunaid SI-100L, Sunaid SI-80, Sunaid SI-100, Sunaid SI-145, Sunaid SI-150, Sunaid SI-160 (tradename, manufactured by Sanshin Kagaku Kogyo) etc.

Among these initiators, the iodonium salt initiator is superior in polymerization reactivity to other cation polymerization initiators.

The cation polymerization initiators described above can be used singly or as a mixture of two or more thereof. A sensitizer or the like can also be added to the photo cation polymerizable resin composition of the present invention. The photo cation polymerizable resin composition can be polymerized by further heating after irradiation with active energy rays.

The photo cation polymerizable resin composition containing (A), (B) and (C) shows curing properties superior to those of the photo cation curing resin compositions cited in the patent literatures, and upon addition of the photo-radical polymerization initiator (D), further excellent curing properties are exhibited. The photo radical polymerization initiator (D) used in the present invention is a compound which forms radicals by active energy rays. Among these compounds, acetophenone compounds such as benzyl dimethyl ketal and α-hydroxyketone are preferable. Specific examples include 2,2-dimethoxy-1,2-diphenylethane-1-one, 1-hydroxy-cyclohexyl-phenyl-ketone, 2-hydroxy-2-methyl-1-phenyl-propan-1-one, 1-hydroxy-cyclohexyl-phenyl-ketone, 2-hydroxy-2-methyl-1-phenyl-propan-1-one, 1-[4-(2-hydroxyethoxy)-phenyl]-2-hydroxy-2-methyl-1-propan-1-one etc. The commercial product includes Irgacure 651, Irgacure 184, Darocure 1173, Irgacure 500, Irgacure 1000, Irgacure 2959 etc., and benzophenone can be used in combination with the acetophenone initiator.

The cation polymerizable resin composition comprising the epoxy compound (A) of formula 1 as an essential ingredient, the cation polymerizable compound (B) other than the epoxy compound of formula 1, and the photo cation polymerization initiator (C) has excellent polymerization properties, and shows excellent characteristics under practical conditions, such as stability, rapid curing and temperature (atmosphere at room temperature) in a specific range, in practical applications such as an adhesive, coating etc. That is, the photo cation polymerization initiator (C) is blended preferably in an amount of 0.1 to 10.0 parts by weight and the photo radical polymerization initiator (D) when used is blended preferably in an amount of up to 10.0 parts by weight based on 100 parts by weight of the epoxy compound (A) of formula 1 and the cation polymerizable compound (B) other than the epoxy compound of formula 1 in the cation polymerizable resin composition of the present invention.

When the cation polymerization initiator (C) is in this range, curing properties are sufficiently exhibited, and in practical applications, water resistance is not deteriorated and the resin is not colored. Even if the photo radical polymerization initiator (D) is not added, sufficient curing occurs, but when a rate of curing comparative with that of the conventional radical polymerization system is desired, a sufficient rate of curing can be achieved by adding the initiator (D) in the range of up to 10.0 parts by weight.

By blending the components (A) to (C) and (D) in a specific range, a cation polymerizable resin composition excellent in curing properties and superior in corrosion resistance with less coloration and less cure shrinkage mentioned in the object described above can be obtained and used directly in various coating materials, adhesives and tackifiers.

Other resin can be used if necessary in the composition of the present invention. The other resin includes, for example, polyamide, polyamide imide, polyurethane, polybutadiene, polychloroprene, polyether, polyester, styrene-butadiene-styrene block copolymer, petroleum resin, xylene resin, ketone resin, cellulose resin, fluorine-based oligomer, silicon-based oligomer, polysulfide-based oligomer etc. These may be used alone or as a mixture of two or more thereof.

A modifier includes, for example, a polymerization initiation aid (optical sensitizer), an aging inhibitor, a leveling agent, a wetting improver, an adhesion enhancer, a surfactant, a plasticizer, a UV absorber etc. These can be used singly or as a mixture thereof.

A diluent can be used for conferring or improving coating properties. As the diluent, a usual organic solvent is used.

The photo cation polymerization is suitable for applications using its characteristic low-cure shrinkage, that is, for applications requiring dimensional accuracy. The cation polymerizable resin composition of the present invention can exhibit high dimensional stability by itself and can also exhibit higher dimensional by its composition in a specific range to serve as a surface protective material for optical disk. A composition which can also improve surface hardness was also found. Specifically, a compound (B-1) whose cation polymerizable functional group equivalent is 700 or more, preferably 700 to 10000, more preferably 700 to 5000 and a compound (B-2) whose cation polymerizable functional group equivalent is less than 700, preferably 100 to 700, more preferably 100 to 300 are used as the cation polymerizable compound (B). The functional group equivalent in this range is suitable in respect of coating suitability.

Examples of the component (B-1) include high-molecular bisphenol A epoxy resin having an epoxy equivalent of 700 or more, hydrogenated products thereof and acrylic resin having glycidyl groups or oxetane groups introduced to adjust the functional group equivalent to 700 or more. Examples of the component (B-2) include acrylic resin having a functional group equivalent regulated to be less than 700, and the previously illustrated compound (B). The compounds (B-1) and (B-2) are used in a specific range. That is, the amount of the compound (B-1) is 5.0 to 40.0 parts by weight, and the amount of the compound (B-2) is 50.0 to 94.9 parts by weight in the cation polymerizable compound (B), relative to 100 parts by weight of the cation ring-opening polymerizable compound (A) and the cation polymerizable compound (B) in total in the cation polymerizable resin composition. When the compound (B-1) is in this range, deformation of an optical disk coated therewith is reduced, the curing rate is suitable, and coating properties are excellent, thus attaining an excellent surface.

EXAMPLES

Hereinafter, the present invention is described in more detail by reference to the Examples and Comparative Examples. Curing properties, hardness, light transmittance, water resistance and cure shrinkage were evaluated in the following methods.

(Curing Properties)

The composition (resin solution) was applied by an applicator to a thickness of 100 μm on the surface of a glass plate (4.5 cm×2.0 cm×0.2 cm), and the glass plate having the resin solution also applied to its edge (0.2 cm) was irradiated with 0.1 J/cm$^2$ with a metal halide lamp, and the degree of curing of the resulting coating film on the surface and edge of the glass plate was evaluated with naked eyes. The degree of curing was designated ○ (no tack), Δ (curing of only the surface or tack on the surface) and x (no curing).

(Hardness)

The coating (irradiated for 1 hour) applied onto the glass plate was evaluated according to a pencil scratch test JIS-K 5400. 6. 14.

(Corrosiveness)

Aluminum was sputtered to a thickness of 100 nm on a glass plate (4.5 cm×2.0 cm×0.2 cm), and the composition was applied by an applicator to a thickness of 100 μm on the surface of the glass plate and irradiated with 0.5 J/cm$^2$ with a metal halide lamp, and a part not coated with the resin was sealed with Kapton Tape (manufactured by Scotch), and this test specimen was left at 85° C.×95% humidity for 24 hours, and the corrosion of aluminum on the surface of the glass plate was evaluated with naked eyes. In this evaluation with naked eyes, a test specimen in the absence of abnormalities such as corrosion on the surface of aluminum was given ○, a test specimen wherein the surface of aluminum had been rendered partially transparent or a test specimen having pinholes was given Δ, and a test specimen wherein the surface of aluminum and the whole surface had been rendered transparent was given x.

Degree of Shrinkage

The specific gravity of the cationic polymerizable resin composition before curing, and the specific gravity of the cation polymerizable resin composition after curing with 0.5 J/cm$^2$, were measured, and the degree of shrinkage was calculated from the specific gravity after curing (specific gravity of solid)/specific gravity before curing (specific gravity of liquid)×100.

Example 1

69.9 parts by weight of hydrogenated bisphenol A epoxy resin (Adeka Resin EP-4080S, manufactured by Asahi Denka) and 30 parts by weight of di[1-ethyl(3-oxetanyl)] methyl ether (Alon Oxetane OXT-221, manufactured by Toagosei Chemical Industry) as the cation polymerizable compound (B) other than the epoxy compound represented by formula 1, and 3 parts by weight of (tolylcumyl)iodonium tetrakis(pentafluorophenyl)borate (RHODORSIL PHOTO-INITIATOR 2074) as the cation polymerization initiator (C) were mixed and dissolved in a light-shielding brown bottle. To this solution were added 0.1 part by weight of β-pinene oxide (manufactured by Atofina) and 0.5 part by weight of Darocure 1173 (manufactured by Ciba Specialty Chemical) as the epoxy compound (A) represented by formula 1, and the mixture was mixed and dissolved to give the cation polymerizable composition of the present invention.

The cation polymerizable resin composition was evaluated according to the evaluation methods described above, and the evaluation results are shown in Table 2.

Examples 2 to 7

Cation polymerizable resin compositions were compounded and evaluated in the same manner as in Example 1 except that the type and amount of the epoxy compound (A) represented by formula 1, the cation polymerizable compound (B) other than the epoxy compound represented by formula 1, the photo cation polymerization initiator (C) and the photo radical polymerization initiator (D) were changed as shown in Table 2. The results are shown in Table 3.

Examples 8 to 10

Cation polymerizable resin compositions were compounded and evaluated in the same manner as in Examples 2 to 4 except that the type of the epoxy compound (A) represented by formula 1 was changed as shown in Table 2, and the photo radical polymerization initiator (D) was not used. The results are shown in Table 3.

Comparative Examples

Cation polymerizable resin compositions were compounded and evaluated in the same manner as in Example 1 except that the type and amount of the epoxy compound (A) represented by formula 1, the cation polymerizable compound (B) other than the epoxy compound represented by formula 1, the photo cation polymerization initiator (C) and the photo radical polymerization initiator (D) were changed as shown in Table 2. The results are shown in Table 3.

Example 11

15.0 parts by weight of Epicoat 1007 as (B-1) whose cation polymerizable functional group equivalent was 700 or more, 45.0 parts by weight of hydrogenated bisphenol A epoxy resin (Adeka Resin EP-4080S, manufactured by Asahi Denka) and 38.0 parts by weight of di[1-ethyl(3-oxetanyl)]methyl ether (Alon Oxetane OXT-221, manufactured by Toagosei Chemical Industry) as (B-2) whose cation polymerizable functional group equivalent was less than 700, and 3 parts by weight of (tolylcumyl)iodonium tetrakis(pentafluorophenyl)borate (RHODORSIL PHOTOINITIATOR 2074) as the cation polymerization initiator (C) were mixed and dissolved in a light-shielding brown bottle. To this solution were added 2.0 parts by weight of myrcene dioxide (manufactured by Atofina) and 0.5 part by weight of Darocure 1173 (manufactured by Ciba Specialty Chemical) as the epoxy compound (A) represented by formula 1, and the mixture was mixed and dissolved to give the cation polymerizable composition of the present invention.

Curing Properties

The composition was applied by a spin coater to a thickness of 100 μm on a polycarbonate disk having a diameter of 120 mm and a thickness of 0.6 mm, and then irradiated with 1 J/cm$^2$ with a metal halide lamp, to give a polycarbonate disk coated with a 100 μm coating film. The surface of the disk perpendicular to the light and the edge of the disk parallel to the light were evaluated for curing properties. In evaluation of the degree of curing, a test specimen which was cured and free of tack was given ◯, a test specimen which was cured on only the surface or a test specimen having tack on the surface was given Δ, and a test specimen which was not cured at all was given x. The results are shown in Table 5.

Warp

One hour after curing, the above disk with the coating surface facing upward was measured for its warp (R-Skew) in the surface in the direction of radius, that is, from the center of the disk to 58 mm apart from the center, by a disk warp measuring device T-7DRB (manufactured by Tobishi Atto), and the disk before coating with the resin was also measured. A change in the maximum warp before and after coating is shown in Table 5.

Hardness

The hardness of the coating surface was measured according to JIS-K 5400, and the results are shown in Table 5.

Examples 12 to 14

Compositions were blended and evaluated in the same manner as in Example 8 except that the type and amount of the epoxy compound (A) represented by formula 1, the compound (B-1) whose cation polymerizable functional group equivalent was 700 or more, and the compound (B-2) whose cation polymerizable functional group equivalent was less than 700 were changed as shown in Table 4. The results are shown in Table 5.

TABLE 1

| Structure | | | | | |
|---|---|---|---|---|---|
| | | | | | |
| Activation energy | 7.3 | 18.7 | 27.3 | 19.4 (trans) 19.3 (cis) | 29.5 | 28 |

TABLE 2

| | Blended material | Molecular weight/ (functional group equivalent) | Examples | | | | | | | | | | Comparative Examples | |
|---|---|---|---|---|---|---|---|---|---|---|---|---|---|---|
| | | | 1 | 2 | 3 | 4 | 5 | 6 | 7 | 8 | 9 | 10 | 1 | 2 |
| (A) Epoxy compound represented by formula 1 | β-Pinene oxide | 152.2 | 0.1 | 5.0 | | | 5.0 | 10.0 | 5.0 | 5.0 | | | | |
| | Limonene dioxide | 168.2 | | | 5.0 | | | | | | 5.0 | | | |
| | Myrcene dioxide | 168.2 | | | | 5.0 | | | | | | 5.0 | | |
| (B) Cation polymerizable compound other than epoxy compound represented by formula 1 | Adeka resin EP-4080S | 210 | 69.9 | | | | | | | | | | 70.0 | 70.0 |
| | Epomix R140 | 192 | | 65.0 | 65.0 | 65.0 | 40.0 | 40.0 | 70.0 | 65.0 | 65.0 | 65.0 | | |
| | Alon oxetane OXT-221 | 107 | 30.0 | 30.0 | 30.0 | 3.0 | 55.0 | 25.0 | | 30.0 | 30.0 | 30.0 | 30.0 | 30.0 |
| | Alon oxetane OXT-211 | 192.5 | | | | | | | 25.0 | 10.0 | | | | |
| | Adeka Optomer KRM2110 | 130 | | | | | | | | 15.0 | | | | |
| (C) Photo cation polymerization initiator | RHODORSIL PHOTOINITIATOR 2074 | | 3.0 | 3.0 | 3.0 | 3.0 | 3.0 | 3.0 | 3.0 | 3.0 | 3.0 | 3.0 | 3.0 | 3.0 |
| | Adeka Optomer SP-170 (active ingredient 50%) | | | | | | 6.1 | 6.0 | 6.0 | | | | | |
| (D) Photo radical polymerization initiator | Irgacure184 | | 0.5 | | | | 1.0 | 1.0 | 1.0 | | | | | 0.5 |
| | Darocure1173 | | | 0.5 | 0.5 | 0.5 | | | | | | | | |
| (Mol number of epoxy group + mol number of oxirane ring represented by formula 1/mol number of oxetane group) | | | 1.19 | 1.32 | 1.42 | 1.42 | 0.47 | 0.75 | 9.87 | 1.32 | 1.42 | 1.42 | 1.19 | 1.19 |

TABLE 3

|  |  |  | Examples |  |  |  |  |  |  |  |  |  | Comparative Examples |  |
|---|---|---|---|---|---|---|---|---|---|---|---|---|---|---|
|  |  |  | 1 | 2 | 3 | 4 | 5 | 6 | 7 | 8 | 9 | 10 | 1 | 2 |
| Curing properties | 0.1 J/cm² UV irradiation | Surface | ○ | ○ | ○ | ○ | ○ | ○ | ○ | ○ | ○ | ○ | Δ | Δ |
|  |  | Edge | ○ | ○ | ○ | ○ | ○ | ○ | ○ | Δ | Δ | Δ | x | x |
|  | 1.0 J/cm² UV irradiation | Surface | ○ | ○ | ○ | ○ | ○ | ○ | ○ | ○ | ○ | ○ | Δ | Δ |
|  |  | Edge | ○ | ○ | ○ | ○ | ○ | ○ | ○ | ○ | ○ | ○ | x | x |
| Hardness |  |  | H | 2H | 2H | 2H | 3H | HB | 2H | 2H | H | H | H | H |
| Water resistance |  |  | ○ | ○ | ○ | ○ | ○ | ○ | ○ | ○ | ○ | ○ | x | x |
| Degree of shrinkage (%) |  |  | 3.5 | 4.0 | 4.0 | 4.0 | 4.5 | 3.0 | 4.5 | 3.9 | 3.8 | 3.8 | 3.5 | 3.5 |

TABLE 4

|  | Blended material | Molecular weight/ (functional group equivalent) | Examples | | | |
|---|---|---|---|---|---|---|
|  |  |  | 11 | 12 | 13 | 14 |
| (A) Epoxy compound represented by formula 1 | Mycene dioxide | 168.2 | 2.0 | 2.0 | 2.0 | 2.0 |
| (B) Cation polymerizable compound (B-2) other than epoxy compound represented by formula 1 | Adeka resin EP-4080S | 210 | 45.0 | 45.0 | 55.0 | 20.0 |
|  | Epomix R140 | 182 |  |  |  |  |
|  | Alon oxetane OXT-211 | 182.5 | 38.0 | 38.0 | 38.0 | 38.0 |
| (B) Cation polymerizable compound (B-1) other than epoxy compound represented by formula 1 | Epicoat 1004 | 825 |  | 15.0 | 5.0 | 40.0 |
|  | Epicoat 1007 | 1875 | 15.0 |  |  |  |
| (C) Photo cation polymerization initiator | RHODORSIL PHOTOINITIATOR 2074 | 630 | 3.0 | 3.0 | 3.0 | 3.0 |
| (D) Photo radical polymerization initiator | Darcoure 1173 |  | 0.5 | 0.5 | 0.5 | 0.5 |
| (Mol number of epoxy group + mol number of oxirane ring represented by formula 1/mol number of oxetane group) |  |  | 1.24 | 0.68 | 0.68 | 0.68 |

TABLE 5

|  |  | Examples | | | |
|---|---|---|---|---|---|
| Evaluation Items |  | 11 | 12 | 13 | 14 |
| Curing properties | Surface | ○ | ○ | ○ | ○ |
|  | Edge | ○ | ○ | ○ | ○ |
| Change in warp (deg) |  | +0.3 | +0.4 | +0.6 | +0.3 |
| Hardness |  | F | F | B | HB |

INDUSTRIAL APPLICABILITY

The cation polymerizable resin composition of the present invention is sufficiently cured with a low quantity of light, is excellent in resin transparency, is excellent in corrosiveness problematic for use in electronic parts etc., hardly undergoes cure shrinkage, and can be used in semiconductor sealing resin, laminate resin, coating material, adhesive, ink and various sealing materials. The composition in a specific range can be used as a material for optical disk and a surface protective material for optical disk.

The invention claimed is:

1. A photo cation polymerizable resin composition comprising (A) a cation ring-opening polymerizable compound whose activation energy in ring-opening reaction at the time of addition of methyl cation is not higher than 15 kcal/mol, (B) a cation polymerizable compound wherein the cation polymerizable compound (B) in the photo cation polymerizable resin composition comprises a cation polymerizable compound (B-1) whose functional group equivalent is 700 or more and a cation polymerizable compound (B-2) whose functional group equivalent is less than 700, and (C) a photo cation polymerization initiator, wherein the cation ring-opening polymerizable compound (A) is a compound having at least one oxirane cyclic group represented by formula 1 in one molecule chain, and the cation polymerizable compound (B) is a cation polymerizable compound not containing a structure represented by formula 1:

[Formula 1]

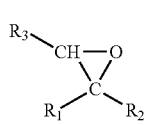

wherein $R_1$ and $R_2$ each represent a substituent containing a carbon atom which bonds to a carbon atom constituting an oxirane ring where the carbon atom in the substituent has a saturated bond or an unsaturated bond, and $R_3$ represents a hydrogen atom or a substituent containing a carbon atom which bonds to a carbon atom constituting an oxirane ring where the carbon atom in the substituent has a saturated bond or an unsaturated bond, and the cation ring-opening polymerizable compound (A) is 0.1 to 10.0 parts by weight and the cation polymerizable compound (B) is 90.0 to 99.9 parts by weight based on 100 parts by weight of (A) and (B) in total in the photo cation polymerizable resin composition.

2. The photo cation polymerizable resin composition according to claim 1, wherein the amount of the photo cation polymerization initiator (C) added is in the range of 0.1 to 10.0 parts by weight based on 100 parts by weight of the cation ring-opening polymerizable compound (A) and the cation polymerizable compound (B) in total in the photo cation polymerizable resin composition.

3. The photo cation polymerizable resin composition according to claim 1, wherein a photo radical polymerization initiator (D) is contained in the range of 10.0 parts by weight or less based on 100 parts by weight of the cation ring-opening polymerizable compound (A) and the cation polymerizable compound (B) in total in the photo cation polymerizable resin composition.

4. The photo cation polymerizable resin composition according to claim 1, wherein a cation polymerizable functional group of the cation polymerizable compound (B) is an epoxy group and/or an oxetane group, and the cation ring-opening polymerizable compound (A) has an epoxy group and/or an oxetane group.

5. The photo cation polymerizable resin composition according to claim 4, wherein the molar ratio of the total moles of epoxy groups and oxirane groups contained in the compound (A) and (B) to the total moles of oxetane groups in the compounds (A) and (B) is 0.01 to 20.0.

6. The photo cation polymerizable resin composition according to claim 1, wherein the photo cation polymerization initiator (C) is an iodonium salt-based initiator.

7. The photo cation polymerizable resin composition according to claim 3, wherein the photo radical polymerization initiator (D) is an acetophenone-based compound.

8. A coating material composition comprising the photo cation polymerizable resin composition according to any one of claims 1 and 2 to 7.

9. An adhesive composition comprising the photo cation polymerizable resin composition according to any one of claims 1 and 2 to 7.

10. The photo cation polymerizable resin composition according to claim 1, wherein the compound (B-1) is 5.0 to 40.0 parts by weight and the compound (B-2) is 50.0 to 94.9 parts by weight in the cation polymerizable compound (B), based on 100 parts by weight of the cation ring-opening polymerizable compound (A) and the cation polymerizable compound (B) in total in the photo cation polymerizable resin composition.

11. A coating material and/or an adhesive using the photo cation polymerizable resin composition according to claim 1, and/or a material for optical disk and a surface protective material for optical disk comprising a protective sheet having the adhesive applied thereon.

12. A photo cation polymerizable resin composition comprising:

(A) a cation ring-opening polymerizable compound whose activation energy in ring-opening reaction at the time of addition of methyl cation is not higher than 15 kcal/mol,
(B) a cation polymerizable compound, and
(C) a photo cation polymerization initiator,
wherein the cation ring-opening polymerizable compound (A) is a compound having at least one oxirane cyclic group represented by formula 1 in one molecule chain, and the cation polymerizable compound (B) is a cation polymerizable compound not containing a structure represented by formula 1:

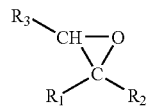

[Formula 1]

wherein $R_1$ and $R_2$ each represent a substituent containing a carbon atom which bonds to a carbon atom constituting an oxirane ring where the carbon atom in the substituent has a saturated bond or an unsaturated bond, and $R_3$ represents a hydrogen atom or a substituent containing a carbon atom which bonds to a carbon atom constituting an oxirane ring where the carbon atom in the substituent has a saturated bond or an unsaturated bond and wherein a cation polymerizable functional group of the cation polymerizable compound (B) is an epoxy group and/or an oxetane group, and the cation ring-opening polymerizable compound (A) has an epoxy group and/or an oxetane group, and the cation ring-opening polymerizable compound (A) is 0.1 to 10.0 parts by weight and the cation polymerizable compound (B) is 90.0 to 99.9 parts by weight based on 100 parts by weight of (A) and (B) in total in the photo cation polymerizable resin composition and wherein the molar ratio of the total moles of epoxy groups and oxirane groups contained in the compound (A) and (B) to the total moles of oxetane groups in the compounds (A) and (B) is 0.01 to 20.0.

13. The photo cation polymerizable resin composition according to claim 12, wherein the amount of the photo cation polymerization initiator (C) added is in the range of 0.1 to 10.0 parts by weight based on 100 parts by weight of the cation ring-opening polymerizable compound (A) and the cation polymerizable compound (B) in total in the photo cation polymerizable resin composition.

14. The photo cation polymerizable resin composition according to claim 12, wherein a photo radical polymerization initiator (D) is contained in the range of 10.0 parts by weight or less based on 100 parts by weight of the cation ring-opening polymerizable compound (A) and the cation polymerizable compound (B) in total in the photo cation polymerizable resin composition.

15. The photo cation polymerizable resin composition according to claim 12, wherein the photo cation polymerization initiator (C) is an iodonium salt-based initiator.

16. The photo cation polymerizable resin composition according to claim 14, wherein the photo radical polymerization initiator (D) is an acetophenone-based compound.

17. A coating material composition comprising the photo cation polymerizable resin composition according to claim 12.

18. An adhesive composition comprising the photo cation polymerizable resin composition according to claim 12.

19. A coating material and/or an adhesive using the photo cation polymerizable resin composition according to claim 12, and/or a material for optical disk and a surface protective material for optical disk comprising a protective sheet having the adhesive applied thereon.

* * * * *